US005234192A

United States Patent [19]

Kalippke et al.

[11] Patent Number: 5,234,192

[45] Date of Patent: Aug. 10, 1993

[54] ROTATIONAL CONTROL DEVICE

[75] Inventors: Harald Kalippke, Benningen; Friedrich Wendel, Weissach; Erhard Renninger; Johannes Meiwes, both of Markgroeningen; Albert Gerhard, Tamm; Dieter Dick, Muehlacker; Herbert Becker, Hemmingen, all of Fed. Rep. of Germany

[73] Assignee: Robert Bosch GmbH, Stuttgart, Fed. Rep. of Germany

[21] Appl. No.: 917,062

[22] PCT Filed: Nov. 16, 1991

[86] PCT No.: PCT/DE91/00903

§ 371 Date: Aug. 5, 1992

§ 102(e) Date: Aug. 5, 1992

[87] PCT Pub. No.: WO92/10664

PCT Pub. Date: Jun. 25, 1992

[30] Foreign Application Priority Data

Dec. 5, 1990 [DE] Fed. Rep. of Germany ....... 4038760

[51] Int. Cl.[5] ......................... F16K 31/08; H01F 7/14

[52] U.S. Cl. ................................. 251/129.11; 251/65; 251/129.12; 251/368

[58] Field of Search ...................... 251/11, 12, 65, 368

[56] References Cited

U.S. PATENT DOCUMENTS 4,428,558 1/1984 Odogaki et al. ...................... 251/65
4,647,009 3/1987 Idogaki et al. ................. 251/129.12
4,976,237 12/1990 Bollinger .................... 251/129.11 X

*Primary Examiner*—Arnold Rosenthal
*Attorney, Agent, or Firm*—Edwin E. Greigg; Ronald E. Greigg

[57] ABSTRACT

A rotational control device for the setting of angles in actuators, in particular of a restricting device used for determining the flow cross-section in a flow line for internal combustion engines, has an electrical setting motor with a two-pole status and a two-pole permanent magnet rotor. To obtain a robust setting motor, which is technically easy to manufacture in a compact construction, the stator poles are designed as claw poles and the stator winding is located as a toroidal coil in a ring space formed by the claw poles and a ring casing which is coaxial with these, for the magnetic return path. The stator winding is energized by a d.c. supply, with reversible current direction. The magnetic resistances in the magnetic return path and across the claw poles are calibrated such that in the event of a currentless stator winding, the permanent magnet rotor engages in the pole gaps between the claw poles.

19 Claims, 2 Drawing Sheets

ROTATIONAL CONTROL DEVICE

STATE OF TECHNOLOGY

The invention is based on a rotational control device for setting the angle of regulating elements, in particular on a restricting device used for determining the flow cross-section in a flow line for internal combustion engines.

In a known control device of this type (DE 38 30 114 A1), the two stator poles used to generate the magnetic reset moment in the event of a currentless setting motor are designed asymmetrical with a pole width significantly deviating, one from the other in the circumferential direction. The rotor poles, which are designed as shell shaped magnet segments, are arranged asymmetrically on the rotor and extend in each case circumferentially over an angle greater than 90°, in which arrangement the smaller pole width of the stator pole measured on the circumference is approximately equal to the angle over which the rotor poles extend. The stator winding, as a cylindrical coil, embraces a magnetic return path loop which connects the two stator poles with each other. Such a rotational control device involves high manufacturing costs due to the pronounced asymmetry.

ADVANTAGES OF THE INVENTION

In contrast, the control device in accordance with the invention has the advantage of a setting motor of compact construction which is easily manufactured in terms of production technology and in which the magnetic moment is sufficiently large to return the throttle element, in the event of a currentless setting motor, to its starting position which exposes a defined minimum aperture cross-section. The setting motor is robust and has low susceptibility to faults. By operating the stator winding with a direct current with reversible current direction, e.g. via an end stage which can supply both current directions, an adequately sized rotor setting angle is achieved between the closing position of the restricting device, at which the exposed aperture cross-section of the flow line is zero, and the end position of the restricting device, at which the exposed aperture cross-section of the flow line is maximum.

The magnetic engagement on the pole gaps between the two claw poles of the rotor, i.e. its magnetic return moment in the event of a currentless stator winding, can be strengthened by providing arched recesses in the central region of the front face connections of claw poles and ring casing in accordance with a first embodiment of the invention. This results in a reduction of the cross-section in the magnetic return path, so that the ratio of the magnetic resistances in the return path and in transverse direction of the claw poles, which determines the magnitude of the engagement moment, is increased.

The magnetic engagement on the pole gaps can alternatively be strengthened by the air gap under the claw poles being dimensioned in accordance with a preferred embodiment such that the radial air gap width in the central region of the claw poles is larger than in the edge zones of the claw poles, viewed in circumferential direction.

In a preferred embodiment of the invention, the magnet material for the permanent magnet rotor is hard ferrite or plastic bonded ferrite or plastic bonded neodymium iron boron. By comparison with the rare earth magnet material, a substantial reduction of the manufacturing costs is achieved. The rotor may have a cylindrical permanent magnet with diametric magnetisation direction, which accommodates the rotor shaft torsionally rigid in a central axial bore, or is pivoted on a stub axle, or it may have two shell shaped magnet segments which are fixed on a cylindrical carrier which is connected to the rotor shaft. The radial magnetisation direction in the two magnet segments extends in one magnet segment from the outside inwards and extends in the other magnet segment from the inside outwards. The attachment of the permanent magnet or of the permanent magnet segments on the rotor shaft or on the carrier connected with the rotor shaft is in both cases preferably by means of plastic moulding.

A stator design which is simple in terms of production technology can be achieved in that the stator in accordance with a further embodiment of the invention consists of two identically designed stator parts, each having a claw pole and which after relative rotation in the separating plane, and after relative rotation of 180°, in a plane of rotation which extends along the stator axis at right angles to the separating plane, are joined in a separating plane which is aligned at right angles to the stator axis.

DRAWING

The invention is explained in more detail by means of embodiment examples shown in the drawing and by the description below. The illustrations show:

FIG. 1 a longitudinal cross-section of a rotational control device for an internal combustion engine;

FIG. 2 a schematic exploded view of a setting motor without a winding, in the rotational control device of FIG. 1;

FIG. 3 a view of the rotational control device in the direction of the arrow III in FIG. 2; and FIG. 4 a similar presentation as in FIG. 3 of the setting motor in accordance with a further embodiment example.

DESCRIPTION OF THE EMBODIMENT EXAMPLES

Figure 1:
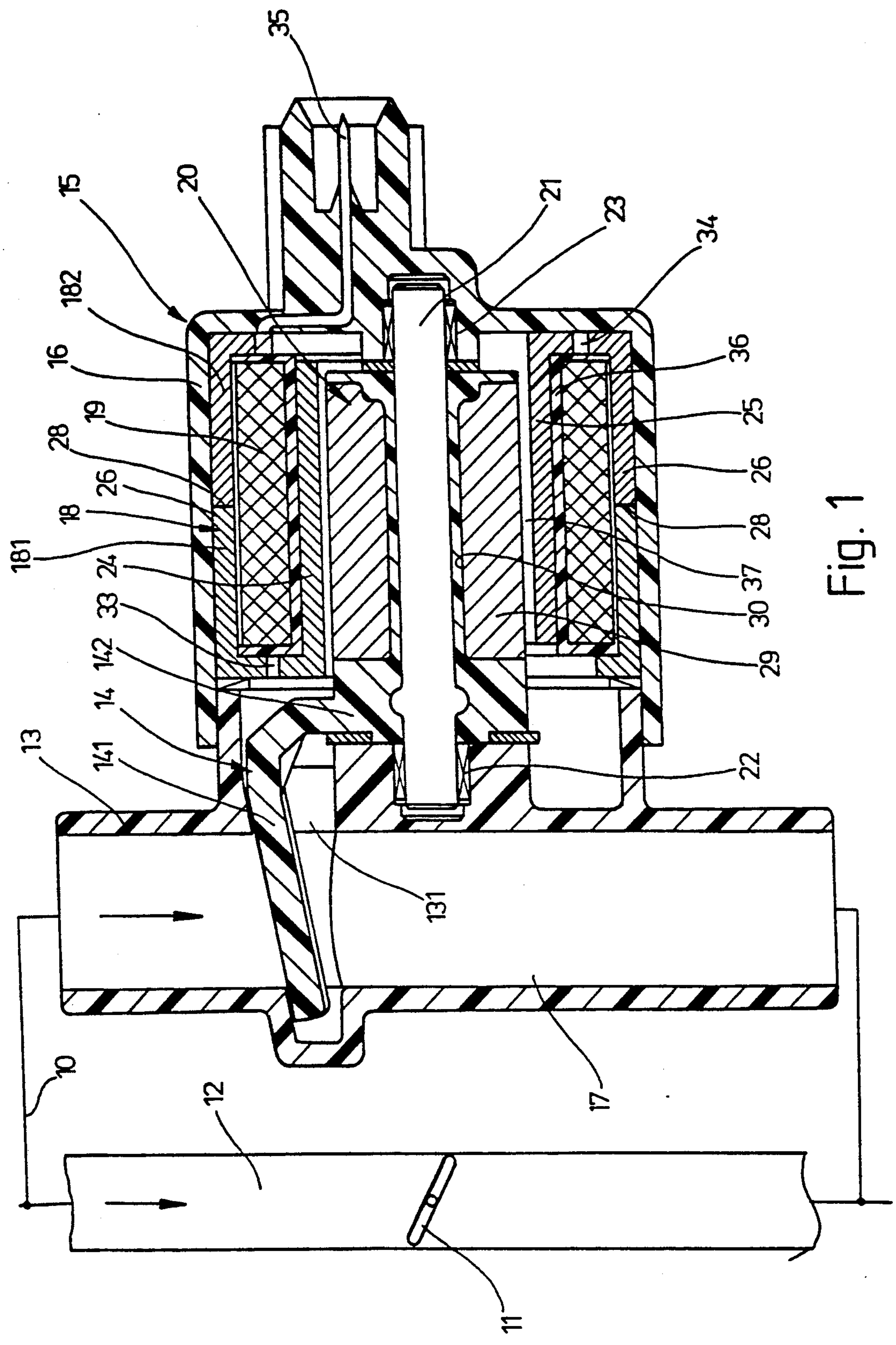

The rotational control device shown in longitudinal cross-section in FIG. 1 is used for the control of the aperture cross-section of a bypass line 10 around a schematically represented throttle 11 in the induction pipe 12 of an internal combustion engine for the purpose of idling speed control. The rotational control device has an actuator housing 13, which is made of plastic material, in which a long flow channel 17 is formed, the aperture cross-section of which is controllable by a restricting device 14 which is designed as a rotary valve. The restricting device 14 is actuated by setting motor 15, which is accommodated in a motor housing 16. The motor housing 16 is adjoined to the actuator housing 13 at right angles to the axis of the same, with the restricting device 14, together with a control part 141 penetrating the flow channel 17 transversely through an arc shaped breakthrough 131 in the actuator housing 13.

The setting motor 15, in a manner generally known, comprises a stator 18 with stator winding 19 held on the motor housing 16, and a permanent magnet rotor 20 which is coaxial with the stator, in which the rotor is located torsionally rigid on the rotor shaft 21, which itself is supported, rotatable, at bearing points 22,23 on the actuator housing 13 and on the motor housing 16, respectively. The throttle element 14 is located with a fixing part 142 torsionally rigid on the rotor shaft 21. The throttle element 14 is made as one piece with the control part 141 and the fixing part 142, of plastic material, with the fixing on the rotor shaft 21 being effected by injection moulding to the rotor shaft 21 during injection moulding of the throttle element 14.

Figure 2:
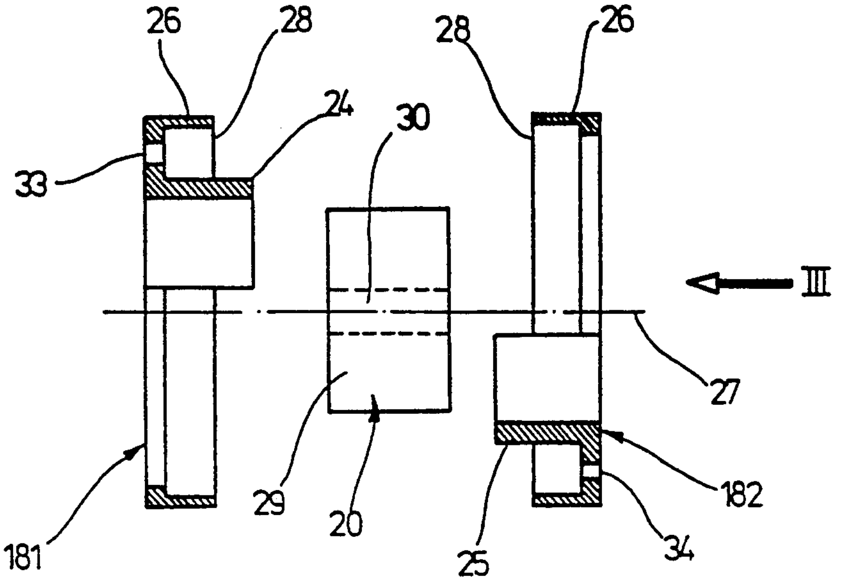
Figure 3:
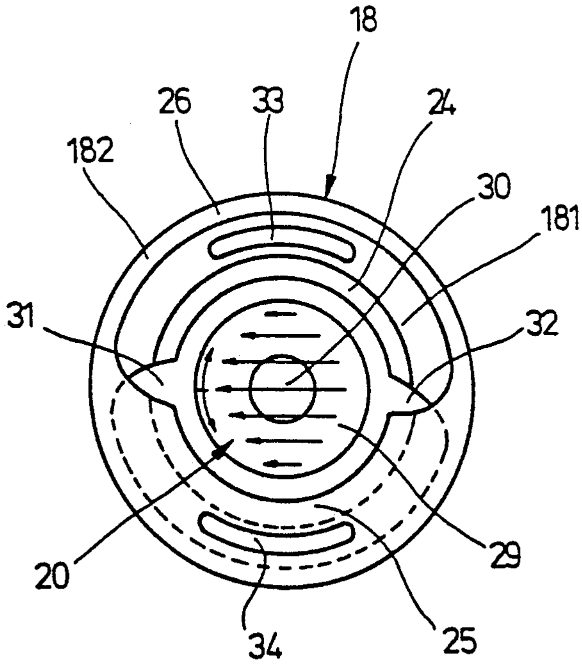

Two claw poles 24,25 are arranged on the stator 18, offset against each other by 180° in circumferential direction, which are connected on opposing front faces to a ring casing 26 which encompasses the claw poles 24,25 with radial clearance, for the magnetic return path. Located in the ring space which is limited by the ring casing 26 and the claw poles 24,25 is the stator winding 19 which is formed as a toroidal coil and which is wound on a spool carrier 36 of plastic material. To facilitate simple mounting of the stator winding 19 with the spool carrier 36, the stator 18 is made of two identically constructed stator portions 181 and 182, which is illustrated in particular in FIG. 2. The two stator portions 181,182 are adjoined in a separating plane 28 which is aligned at right angles in relation to the stator axis 27, namely, on the one hand, after one stator portion 182 has been rotated in the separating plane 28 by 180° relative to the first stator portion 181, and on the other hand, additionally by 180° relative to the first stator portion 181 in a rotational plane which extends along the stator axis 27 at right angles in relation to the separating plane 28. The composite stator 18 is shown in FIG. 1, where the different stator parts have been made identifiable by different hatching. A front view of the stator 18 and the rotor 20 in the direction of the arrow III in FIG. 2 is shown in FIG. 3. The two claw poles 24,25, positioned opposite each other by 180° can be clearly seen.

The rotor 20 carries a cylindrical permanent magnet 29 with diametric magnetisation direction, schematically shown in FIG. 3. The material used for the magnet is hard ferrite or plastic bonded ferrite or plastic bonded neodymium iron boron. The permanent magnet 29 with a central axial bore 30 is pushed over the rotor shaft 21, and during the injection moulding of the throttle element 14, it is moulded onto the rotor shaft 21, so that the permanent magnet 29 is located torsionally rigid on the rotor shaft 21. For a so-called currentless emergency operation of the rotational control device, during which the throttle element 14 must expose a predetermined minimum aperture cross-section in the flow channel 17 of the actuator housing 13, an engagement of the rotor 20 on the pole gaps 31,32 between the claw poles 24,25 is effected in the event of a currentless stator winding 19, by means of appropriate calibration of the magnetic resistances in the magnetic return path. The restricting device 14, being assigned to the rotor 20, is then fixed on the rotor shaft 21 such that it exposes the desired minimum aperture cross-section in the flow channel 17.

A strong engagement of the rotor 20 on the pole gaps 31,32 is achieved by providing an arc shaped recess 33 and 34, respectively, in the middle region of the frontal connections of the claw poles 24,25 to the ring casing 26. Due to the arc shaped recesses 33,34, the cross-section in the magnetic return path is significantly reduced, thereby markedly increasing the ratio of the magnetic resistances in the magnetic return path and in transverse direction of the claw poles 24,25, which is of determinant importance for the size of the return moment. The stator winding 19 is energised by a direct current with reversible current direction. This can be effected, for example, by connecting the stator winding 19 via a connecting plug 35, which is formed as one piece with the plastic motor housing 16, to an end stage which can supply both current directions.

Figure 4:
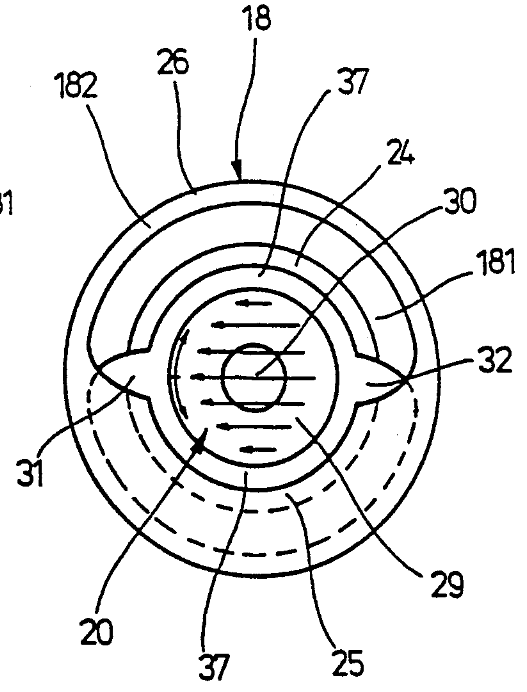

In a further embodiment of the stator 18, shown in FIG. 4, the strength of engagement of the rotor 20 on the pole gaps 31,32 is achieved by reducing the air gap 37 at the edges of the claw poles 24,25. In this arrangement, the claw poles 24,25 are designed such that the radial air gap width in the central region of the claw poles 24,25 is larger than in the two edge zones of the claw poles 24,25, viewed in circumferential direction. The magnetic air gap resistances at the claw pole edges are thus lower than at the claw pole centre, which leads to the increase of the return moment for the rotor 20 in the event of a currentless stator winding 19, albeit that this advantage is obtained at the expense of a restricted setting angle of the rotor 20, which amounts to approximately 40° in the embodiment example of FIG. 4. However, due to the possibility of moving the rotor 20 in inverse rotating directions, the total possible setting angle for the restricting device 14 is adequate for the purpose of its application in internal combustion engines.

The invention is not restricted to the described embodiment examples. The rotor can, for example, have two shell-shaped permanent magnet segments which are fixed on a cylindrical carrier and which have a radial magnetisation direction. The magnetisation direction of one magnet segment on the rotor is from the outside inwards, and the magnetisation direction of the other is from the inside outwards. The cylindrical carrier for the magnet segments is connected to the rotor shaft torsionally rigid. The fixing of the magnet segments on the carrier is again by plastic injection moulding.

We claim:

1. A rotational control device for setting the turning angle of actuators, in particular on a restricting device used for determining the flow cross-section in a flow line for internal combustion engines, comprising an electric setting motor, having a stator with two stator poles and a stator winding and a two-pole permanent magnet rotor which is designed such that in the event of a currentless stator winding, a return torque acts on the permanent magnet rotor, pulling the magnet rotor back to its starting position, and with a torsionally rigid coupling of the restrictive device to the rotor such that in the rotor's starting position, the restrictive device exposes a predetermined minimum restriction cross-section in the flow line, the stator poles are designed as claw poles (24, 25), which, on opposing front faces are each connected to a ring casing (26) which encompasses the claw poles (24, 25) with a radial clearance, for the magnetic return path, the stator winding (19) is located as a toroidal coil in a ring space formed by the ring casing (26) and the claw poles (24, 25) and can be energized by a direct current with reversible current direction, and that the magnetic resistances in the magnetic return path and transverse to the radial axes of the claw poles (24, 25) are dimensioned such that in the event of a currentless stator winding (19), the permanent magnet rotor (20) engages on the pole gaps (31, 32) between the claw poles (24, 25).

2. A rotational control device in accordance with claim 1, in which are shaped recesses (34, 35) are provided on the central region of the front face connections of the claw poles (24, 25) and the ring casing (26).

3. A rotational control device in accordance with claim 1, in which the claw poles (24, 25) are designed such that a width of a radial air gap width (37) between each claw pole (24, 25) and the permanent magnet rotor (20) in the central region of the claw poles (24, 25) is greater than in the two edge zones of the claw poles (24, 25).

4. A rotational control device in accordance with claim 1, in which a hard ferrite, plastic bonded ferrite or plastic bonded neodymium iron boron is used as the material for the permanent magnet rotor (20).

5. A rotational control device in accordance with claim 2, in which a hard ferrite, plastic bonded ferrite or plastic bonded neodymium iron boron is used as the material for the permanent magnet rotor (20).

6. A rotational control device in accordance with claim 3, in which a hard ferrite, plastic bonded ferrite or plastic bonded neodymium iron boron is used as the material for the permanent magnet rotor (20).

7. A rotational control device in accordance with claim 1, in which the permanent magnet rotor (20) has a cylindrical permanent magnet (29) which accommodates a rotor shaft (21) in an axial bore (30).

8. A rotational control device in accordance with claim 2, in which the permanent magnet rotor (20) has a cylindrical permanent magnet (29) which accommodates a rotor shaft (21) in an axial bore (30).

9. A rotational control device in accordance with claim 3, in which the permanent magnet rotor (20) has a cylindrical permanent magnet (29) which accommodates a rotor shaft (21) in an axial bore (30).

10. A rotational control device in accordance with claim 4, in which the permanent magnet rotor (20) has a cylindrical permanent magnet (29) which accommodates a rotor shaft (21) in an axial bore (30).

11. A rotational control device in accordance with claim 1, in which the permanent magnet rotor (20) has a cylindrical permanent magnet (29) which is supported torsionally rigid on a stub axle which penetrates an axial bore (30) of the permanent magnet (29).

12. A rotational control device in accordance with claim 2, in which the permanent magnet rotor (20) has a cylindrical permanent magnet (29) which is supported torsionally rigid on a stub axle which penetrates an axial bore (30) of the permanent magnet (29).

13. A rotational control device in accordance with claim 3, in which the permanent magnet rotor (20) has a cylindrical permanent magnet (29) which is supported torsionally rigid on a stub axle which penetrates an axial bore (30) of the permanent magnet (29).

14. A rotational control device in accordance with claim 4, in which the permanent magnet rotor (20) has a cylindrical permanent magnet (29) which is supported torsionally rigid on a stub axle which penetrates an axial bore (30) of the permanent magnet (29).

15. A rotational control device in accordance with claim 1, in which the permanent magnet rotor has two shell shaped magnet segments which are fixed on a cylindrical support with radial magnetization direction in both, with the magnetization direction of one magnet segment extending from an outside inwards and that of the other magnet segment extending from an inside outwards.

16. A rotational control device in accordance with claim 2, in which the permanent magnet rotor has two shell shaped magnet segments which are fixed on a cylindrical support with radial magnetization direction in both, with the magnetization direction of one magnet segment extending from an outside inwards and that of the other magnet segment extending from an inside outwards.

17. A rotational control device in accordance with claim 3, in which the permanent magnet rotor has two shell shaped magnet segments which are fixed on a cylindrical support with radial magnetization direction in both, with the magnetization direction of one magnet segment extending from an outside inwards and that of the other magnet segment extending from an inside outwards.

18. A rotational control device in accordance with claim 4, in which the permanent magnet rotor has two shell shaped magnet segments which are fixed on a cylindrical support with radial magnetization direction in both, with the magnetization direction of one magnet segment extending from an outside inwards and that of the other magnet segment extending from an inside outwards.

19. A rotational control device in accordance with claim 1, in which the stator (18) comprises two identically constructed stator parts (181,182), each having a claw pole (24,25) and which after relative rotation in a separating plane (28), and after relative rotation of 180° , in a plane of rotation which extends along the stator axis (27) at right angles to the separating plane (28), are joined in separating plane (28) which is aligned at right angles to the stator axis (27).

* * * * *